United States Patent
Bohnenkamp

(10) Patent No.: US 10,979,486 B2
(45) Date of Patent: Apr. 13, 2021

(54) CHAINED FILE DISTRIBUTION TO MULTIPLE CLIENTS

(71) Applicant: MeVis Medical Solutions AG, Bremen (DE)

(72) Inventor: Sascha Bohnenkamp, Bremen (DE)

(73) Assignee: MeVis Medical Solutions AG, Bremen (DE)

( * ) Notice: Subject to any disclaimer, the term of this patent is extended or adjusted under 35 U.S.C. 154(b) by 174 days.

(21) Appl. No.: 15/814,574

(22) Filed: Nov. 16, 2017

(65) Prior Publication Data
US 2019/0132379 A1 May 2, 2019

(30) Foreign Application Priority Data
Nov. 1, 2017 (EP) ..................................... 17199565

(51) Int. Cl.
*H04L 29/08* (2006.01)
*H04L 5/14* (2006.01)
*H04L 29/06* (2006.01)

(52) U.S. Cl.
CPC ................. *H04L 67/06* (2013.01); *H04L 5/14* (2013.01); *H04L 67/2842* (2013.01); *H04L 67/2885* (2013.01); *H04L 67/42* (2013.01)

(58) Field of Classification Search
CPC ............ H04L 67/06; H04L 5/14; H04L 67/42
See application file for complete search history.

(56) References Cited

U.S. PATENT DOCUMENTS

| 8,639,831 B2 * | 1/2014 | Painter | H04N 7/17318 |
| | | | 709/203 |
| 9,641,566 B1 * | 5/2017 | Hiremath | H04N 21/2743 |
| 2003/0084183 A1 | 5/2003 | Odlund et al. | |
| 2008/0065771 A1 * | 3/2008 | Marvit | G06Q 10/10 |
| | | | 709/226 |
| 2011/0219142 A1 * | 9/2011 | Lin | H04L 12/1863 |
| | | | 709/235 |
| 2012/0297405 A1 | 11/2012 | Zhang et al. | |
| 2015/0180795 A1 * | 6/2015 | El-Ansary | H04L 67/1091 |
| | | | 709/226 |

(Continued)

FOREIGN PATENT DOCUMENTS

| GB | 2319710 | 5/1998 |
| WO | 00/16519 A2 | 3/2000 |
| WO | 00/16519 A3 | 3/2000 |

(Continued)

OTHER PUBLICATIONS

European Application No. 17199565.7—Search Report dated Apr. 4, 2019.

(Continued)

*Primary Examiner* — Viet D Vu
(74) *Attorney, Agent, or Firm* — Laurence & Phillips IP Law

(57) ABSTRACT

Some embodiments include transmitting a plurality of files from a server to a first client through a first communication link; and transmitting the plurality of files from the first client to a second client through a second communication link while transmitting at least one of the plurality of files from the server to the first client; wherein the second communication link has at least some bandwidth independent of the first communication link.

20 Claims, 7 Drawing Sheets

(56) References Cited

U.S. PATENT DOCUMENTS

2017/0339220 A1* 11/2017 Huang .................... H04L 29/08

FOREIGN PATENT DOCUMENTS

| WO | WO 01/31861 | 5/2001 |
| WO | WO 01/31861 A1 | 5/2001 |

OTHER PUBLICATIONS

European Application No. 17199565.7—Report Form 2001 dated Mar. 3, 2020.
European Application No. 17199565.7—Report Form 2906 dated Mar. 3, 2020.

* cited by examiner

CHAINED FILE DISTRIBUTION TO MULTIPLE CLIENTS

BACKGROUND

This disclosure relates to data distribution to multiple clients over a network.

Large amounts of data may be collected at a single source server. This data may be used by multiple clients connected to the server through a network. However, when distributing the large amounts of data from the server to multiple clients, the bandwidth of the connection from the server to the network can limit the speed at which the data may be transmitted to the clients. For example, the server may transfer 300 files that are each 600 MB to 20 clients through a 100 MB/s bandwidth connection to the network. The time for this transfer is 10 hours. This type of transfer may occur every day. If more clients are added, the file size increases, or the like, the time to transfer the data to the clients each day may approach or exceed one day.

DETAILED DESCRIPTION

In some embodiments, a large amount of data is transferred from a server to multiple clients. For example, the data may include multiple images to be transferred to the clients. With images that are smaller in size, the distribution from a server directly to clients may be fast enough for a given number of clients. For example, the time to transfer files to each of 20 clients through a 100 MB/s bandwidth connection from a server to a network may be less than 8-10 hours. As a result, the transfer of the data may be performed during an assigned period each day, such as at night. However, any increase in the file size, number of files, number of clients, or the like may increase the time to transfer the files to all of the clients so that the data may not be transferred to all of the desired clients during the available period.

In particular, this problem is exacerbated by high-resolution data (e.g., high-resolution tomographic image data) that may be up to five times larger than similar, non-high-resolution data. With this high-resolution data, the distribution may already reach network limitations with a lower number of clients, such as 4 clients. Performance limitations in the past may have included the hard disk performance on the server and the clients. However, after some improvements, the network bandwidth from the server to a network, and in particular, a network switch may become the bottleneck. For example, this bottleneck may be about 120 MB/s for 1 Gb/s Ethernet. As will be described in further detail below, the clients may be used to help in the distribution of the data.

Figure 1A:
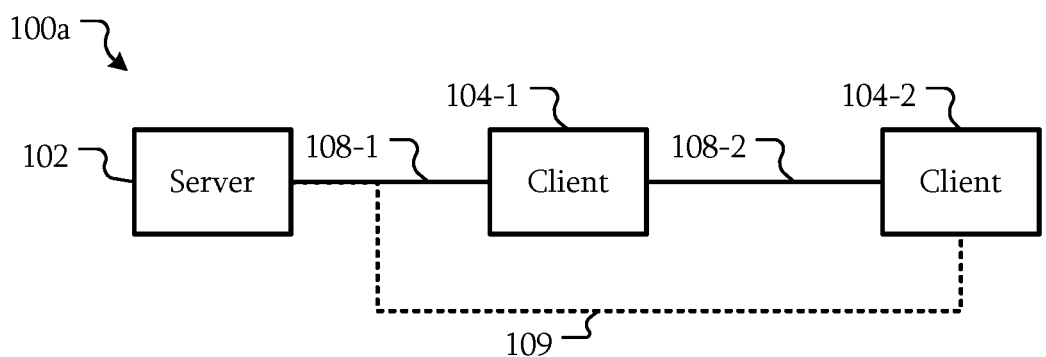
FIG. 1A is a block diagram of a system according to some embodiments.

FIG. 1A is a block diagram of a system according to some embodiments. In some embodiments, a system 100a includes a server 102 and clients 104-1 and 104-2. The server 102 is connected to the client 104-1 through communication link 108-1. The client 104-1 is connected to the client 104-2 through communication link 108-2.

The server 102 is a computer system capable of communicating with one or more other computer systems, such as the clients 104, over a network. For example, the server 102 may include a processor, memory devices, network interfaces, or the like. The server 102 may be configured to be a single point of distribution of data to the clients 104. For example, the server 102 may be configured to aggregate data, such as image data, from various sources. In some embodiments, the server 102 has access to a storage area network or other network-based storage configured to store the data. Regardless, the data passes through the server 102 as it is distributed to the clients 104.

The clients 104 are computer systems capable of communicating with one or more other computer systems, such as the server 102 and clients 104, over a network. The clients may include components similar to the server 102. The clients 104 and the server 102 may, but need not have identical components. In addition, the clients 104 and server 102 may have similar or identical software. As will be described in further detail below, the server 102 may transmit a file to one or more clients 104. Similarly, a client 104 may transmit that file to one or more other clients 104.

The communication links 108 are logical network connections between the respective systems. In some embodiments, the communication links 108 may be separate physical communication links. For example, the communication link 108-1 may be a connection between the sever 102 and the client 104-1 through a first Ethernet local area network (LAN). The communication link 108-2 may be a connection between the client 104-1 and the client 104-2 through a second, separate Ethernet LAN. In other embodiments, the communication links 108 may have shared physical components. For example, as will be described in further detail below, the server 102, client 104-1 and client 104-2 may be each connected to the same network switch.

Regardless of the network architecture, the communication link 108-2 has at least some bandwidth independent of the communication link 108-1. For example, if the communication links 108 are each on a separate network, the bandwidth of the communication link 108-1 may be independent of the bandwidth of the communication link 108-2. That is, using the full bandwidth of the communication link 108-1 may not change the bandwidth of the communication link 108-2.

In another example, some of the bandwidth of the communication link 108-2 may depend on the bandwidth of the communication link 108-1. If the full bandwidth of the communication link 108-1 is used, the bandwidth of the communication link 108-2 may be reduced. However, the communication link 108-2 still has some additional bandwidth available and thus, has some bandwidth independent of the communication link 108-1.

Although some physical connections are used as examples herein, the network architecture, number of networks, connections of the server and clients to the network(s) may be different so long as the communication link 108-2 has at least some bandwidth independent of the communication link 108-1.

Figure 1B:
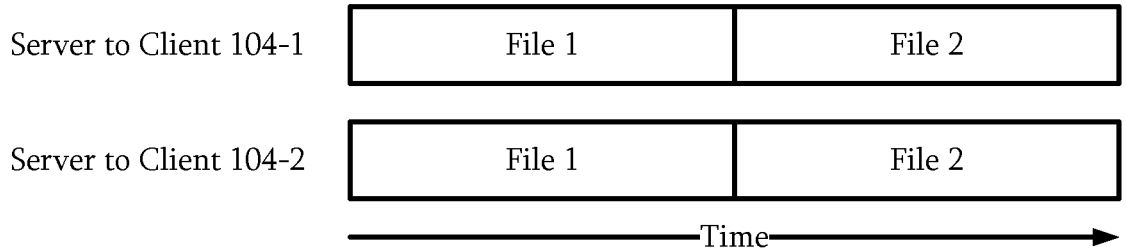
FIG. 1B is a block diagram of a transfer of two files to two clients.
Figure 1C:
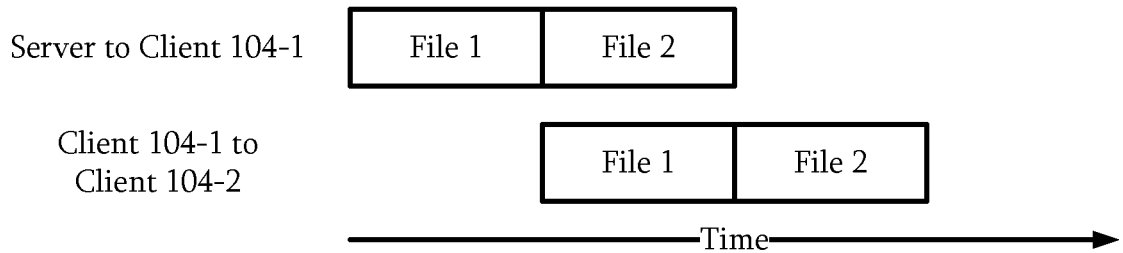
FIGS. 1C and 1D are block diagrams of examples of transfers of two files to two clients according to some embodiments.
Figure 1D:
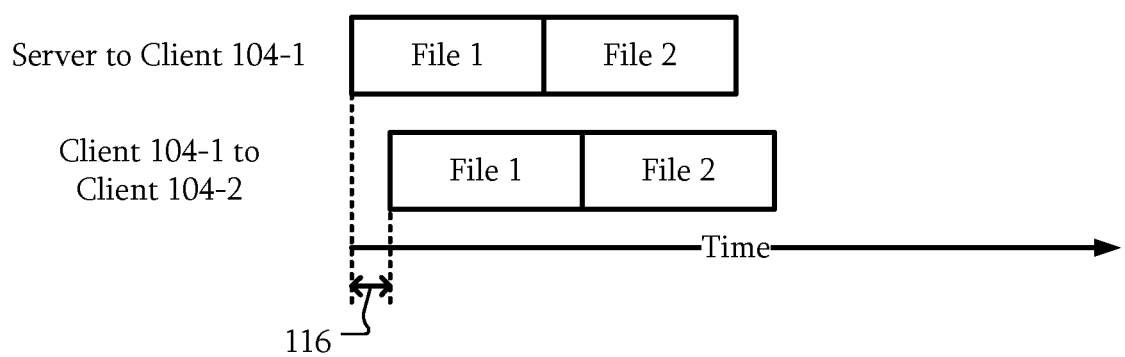

FIG. 1B is a block diagram of a transfer of two files to two clients. FIGS. 1C and 1D are block diagrams of examples of transfers of two files to two clients 104-1 and 104-2 according to some embodiments. Referring to FIG. 1B, in this example, files File 1 and File 2 are transferred from a server 102 to two clients, clients 104-1 and 104-2, through communication links 108-1 and 109, respectively. However, the bandwidths of the communication links 108-1 and 109 from the server 102 to the clients 104-1 and 104-2 are dependent. For example, the communication links 108-1 and 109 may use the same physical connection from the server 102 to the network. Thus, if the full bandwidth of communication link 108-1 to the client 104-1 is used, no bandwidth is available for communication link 109 to client 104-2.

In this example, the full bandwidth of the connection of the server 102 to the network is used to transfer File 1 to clients 104-1 and 104-2 simultaneously. In particular, the full bandwidth is split between communication links 108-1 and 109. After File 1 is transferred, the full bandwidth is used to transfer File 2 to clients 104-1 and 104-2 simultaneously.

Referring to FIGS. 1A-C, in the example of FIG. 1C, the bandwidth of each of the communication links 108-1 and 108-2 are the same as the bandwidth from the server 102 to the network in FIG. 1B. That full bandwidth may be used for the communication link 108-1 between the server 102 and the client 104-1 to transfer File 1 from the server 102 to the client 104-1. As the server 102 is not transferring File 1 to client 104-2 at the same time, File 1 is transferred in half the time. Once the transfer of File 1 is complete, the server 102 transfers File 2 to the client 104-1.

During the time the server is transferring File 2 to the client 104-1, the client 104-1 transfers File 1 over the communication link 108-2 to client 104-2. In this example, the communication link 108-2 has a bandwidth that is the same as and independent of the communication link 108-1. Thus, File 1 is transferred to the client 104-2 in the same time as File 1 was transferred from the server 102 to the client 104-1. Once File 2 is received by the client 104-2 and File 1 has been transmitted to the client 104-2, the client 104-1 may begin transferring File 2 to the client 104-2. Again, as the full bandwidth of the communication link 108-2 may be used, the time to transfer File 2 is half the time as in FIG. 1B.

In both FIGS. 1B and 1C, two files were transferred to two clients 104-1 and 104-2. In addition, the transfer of files in both FIGS. 1B and 1C overlapped at least in part in time. However, in FIG. 1C, due to the bandwidth of the communication link 108-2 being independent of the communication link 108-1, the full bandwidth of communication link 108-1 was used to transfer the files to client 104-1 partially in parallel with the transfer of the files from the client 104-1 to the client 104-2. In addition, the full bandwidth of the communication link 108-2 was used to transfer the files from the client 104-1 to the client 104-2.

Referring to FIGS. 1A-1D, in some embodiments, File 1 and File 2 are transmitted from the server 102 to the client 104-1 through the communication link 108-1 and also transmitted from the client 104-1 to the client 104-2 through the communication link 108-2. However, in FIG. 1D, the transferring of File 1 and File 2 from the client 104-1 to the client 104-2 through the communication link 108-2 begins a time 116 after a portion of File 1 has been transferred from the server 102 to the client 104-1.

For example, the client 104-1 may include a first-in first-out (FIFO) buffer for incoming files from the server 102. As blocks of data forming File 1 are received, the blocks may be stored in the FIFO buffer. Those blocks are then output from the buffer to be stored in a local storage device and then transmitted to the client 104-2. Although a particular, technique of buffering data of the files has been used as an example, the files may be buffered using other techniques.

In some embodiments, the order of the files distributed may be controlled. For example, as illustrated in FIGS. 1C and 1D, each of the clients 104 receives File 1 followed by File 2. If more files are transferred, those files may follow File 2. Although the server 102 is not transmitting the files to client 104-2, the files are transmitted by client 104-1 to the client 104-1 in the same order as they were received by the server 102. Thus, the server 102 may indirectly control the order of the transfer of the files.

As a result, files that may be associated and/or should be transmitted together in a timely manner may be transmitted in series, closer in time than other files, or the like. Examples of such associations include files that are images associated with a single user, project, patient, or the like. These images may be transmitted together or closer in time as described above. As a result, a user that is interested in a particular set of associated files may receive those files at a client 104 in a timely manner, even though the transmission of all files to all clients is not complete.

In some embodiments, the files may be transferred without requiring that the clients 104 have metadata with which the clients 104 may identify the file, initiate a transfer, or the like. While some metadata may be transmitted, such as metadata to ensure an error-free transfer, that metadata may be transmitted to a client 104 as part of the file transfer. For example, the metadata for File 1 is transmitted from the server 102 to the client 104-1 in association with the File 1.

In some embodiments, the upstream server 102 or client 104 initiates the transfer of files to the downstream client(s) 104. For example, when a distribution of multiple files is about to occur, the server 102 imitates the transfer of the files to the client 104-1. The client 104-1 does not request the files from the server 102. Similarly, the client 104-1 initiates the transfer of the files to the client 104-2 without the client 104-2 requesting the files. However, in other embodiments, the transfers may be initiated by the downstream clients 104 or initiated by any of the server 102 and clients 104.

Figure 1E:
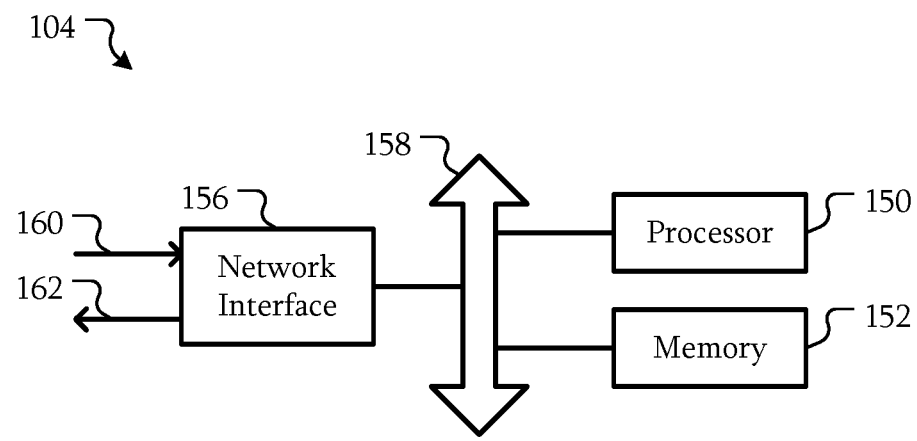
FIG. 1E is a block diagram of a client according to some embodiments.

FIG. 1E is a block diagram of a client according to some embodiments. The client 104 includes a processor 150, a memory device 152, and a network interface 156. A bus 158 couples the processor 150, memory device 152, and network interface 156, allowing those components to communicate.

The processor 150 may be a general purpose processor, a digital signal processor (DSP), an application specific integrated circuit, a microcontroller, a programmable logic device, discrete circuits, a combination of such devices, or the like. Although one processor 150 is illustrated, in other embodiments, and number of processors 150 may be present.

The memory device 152 may be any device capable of storing data. Here, one memory device 152 is illustrated; however, any number of memory devices 152 may be included, including different types of memories. Examples of the memory devices 152 include a dynamic random access memory (DRAM) module, a double data rate synchronous dynamic random access memory (DDR SDRAM) according to various standards such as DDR, DDR2, DDR3, DDR4, static random access memory (SRAM), non-volatile memory such as Flash, spin-transfer torque magentoresistive random access memory (STT-MRAM), or Phase-Change RAM, magnetic or optical media, or the like.

The network interface 156 is an interface that allows the client to communicate over a network. The network interface 156 includes a downstream connection 160 and an upstream connection 162. The network interface 156 is configured to create communication links through the downstream connection 160 and the upstream connection 162. The network interface 156 is configured such that at least one of the two communication links, one using the downstream connection 160 and the other using the upstream connection 162, have at least some bandwidth that is independent of the other communication link. For example, the downstream connection 160 may be part of a connection to a network that is physically separate from the upstream connection 162. In another example, the downstream connection 160 and the upstream connection 162 may be part of the same physical connection, use the same medium, or the like; however, the use of the full bandwidth through the one of the downstream connection 160 and the upstream connection 162 does not prevent transmission through the other.

Referring to FIGS. 1A and 1C-1E, client 104-1 may form the communication link 108-1 with the server 102 through the downstream connection 160. Similarly, the client 104-1 may form the communication link 108-2 with the client 104-2 through the upstream connection 162. As described above, the communication link 108-2 has at least some bandwidth that is independent of the communication link 108-1. As a result, after the client 104-1 has received File 1 as in FIG. 1C or has received part of File 1 as in FIG. 1D, the independent portion of the bandwidths allows File 1 to be transmitted to the client 104-2 while still receiving File 2 or the remainder of File 1.

Figure 2A:
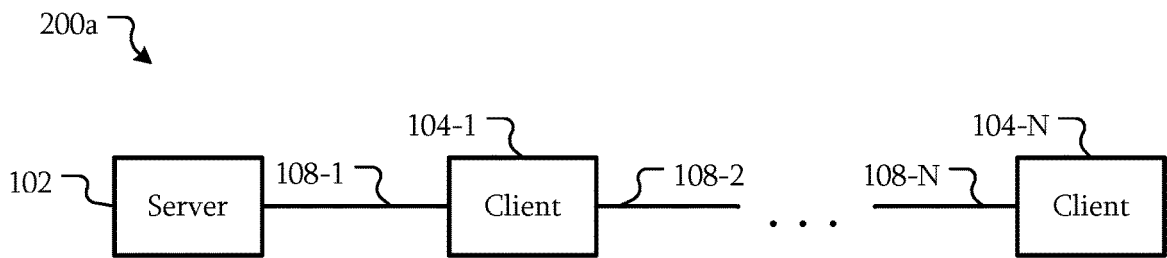
FIGS. 2A-B are block diagrams of systems according to some embodiments.
Figure 2B:
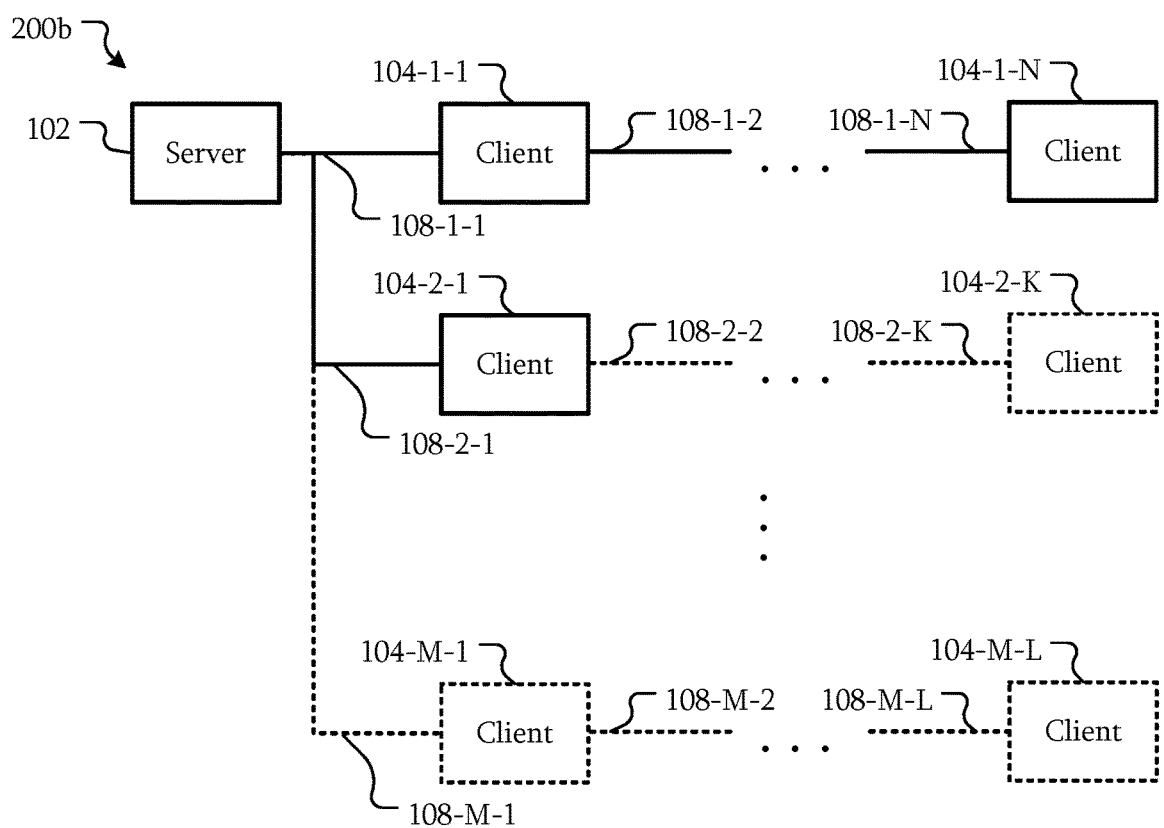

FIGS. 2A-B are block diagrams of systems according to some embodiments. Referring to FIG. 2A, in some embodiments, the system 200a is similar to the system 100a of FIG. 1A. However, the system 200a includes multiple clients 104 serially connected through multiple communication links 108. Here, N clients 104 and N communication links 108 where N is an integer greater than one.

In some embodiments, at least one of the communication links 108 has at least some bandwidth independent of the communication link 108-1. In other embodiments, each of the communication links 108 has bandwidth independent of the other communication links 108. In other embodiments, the dependence of the bandwidths of the communication links 108 may range between fully independent and partially dependent.

Referring to FIG. 2B, in some embodiments, the system 200b may be similar to the system 200a of FIG. 2A. However, the server 102 is coupled to multiple clients 104-x-1 through multiple communication links 108-x-1. Here, M communication links 108 couple the server 102 to M clients 108 where M is an integer greater than 1.

At least one of the clients 104-x-1 is also coupled to other clients 104 through other communication links 108. Here, client 104-1-1 is an example of a client 104 that is connected to a series of clients 104 up to client 104-1-N where N is an integer greater than 1.

In some embodiments, other clients 104 may also be coupled to a series of clients 104. Here, client 104-2-1 may be coupled to a series of clients 104 up to client 104-2-K where K is an integer greater than zero. Similarly, client 104-M-1 may be coupled to a series of clients 104 up to client 104-M-L where L is an integer greater than zero. Each of the series of clients from series 2 to series M may have one or more clients connected in series through corresponding communication links 108. Here, various clients 104 and communication links 108 are illustrated with dashed lines to indicate the potential configurations.

Figure 2C:
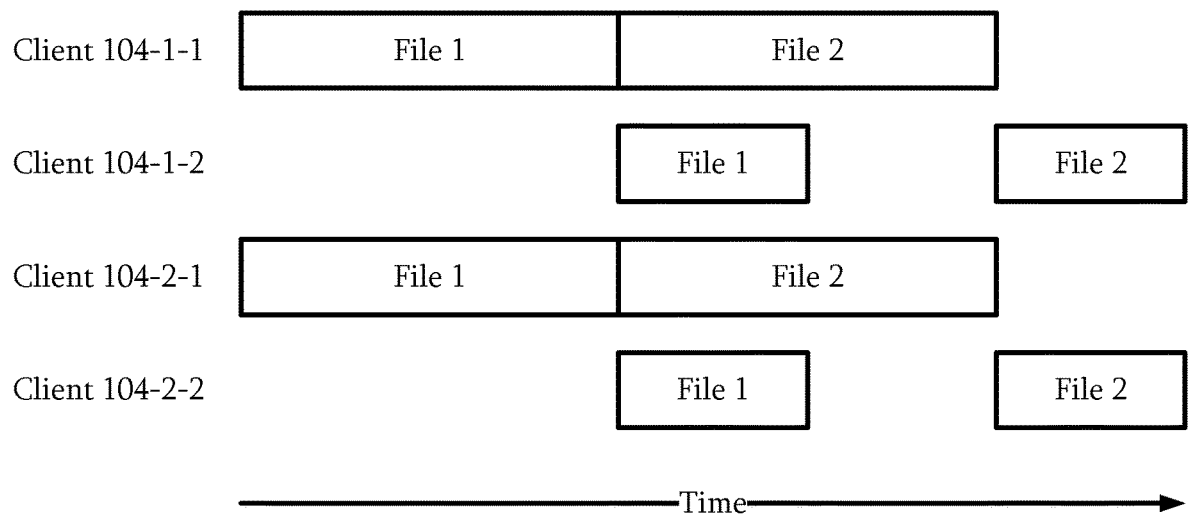
FIG. 2C is a block diagram of an example of a transfer of two files to four clients according to some embodiments.

FIG. 2C is a block diagram of an example of a transfer of two files to four clients according to some embodiments. Referring to FIGS. 2B and 2C, in this example, four clients 104 are coupled as in FIG. 2B where M=2, N=2, and K=2. The server 102 transmits File 1 to clients 104-1-1 and 104-2-1. As the communication links 108-1-1 and 108-2-1 share the same connection to the server 102, the bandwidth to the server 102 is shared. As a result, the transfer of File 1 and File 2 to the clients 104-1-1 and 104-2-1 may occur in parallel, but at half the speed if there was only one client 104.

However, each of the communication links 108-1-2 and 108-2-2 has at least some bandwidth independent of the communication links 108-1-1 and 108-2-1, respectively. Here the bandwidths are independent. Thus, once File 1 is transferred to clients 104-1-1 and 104-2-1, the clients 104-1-1 and 104-2-1 may transmit File 1 to the corresponding clients 104-1-2 and 104-2-2, respectively. As these communication links 108-1-2 and 108-2-2 do not have shared bandwidth, the File 1 may be transferred to the corresponding client 104-1-2 and 104-2-2 using the full bandwidth. File 2 may be similarly transmitted once it is received as the clients 104-1-1 and 104-2-1. Although the transmission of files has been described at a granularity of files, in other embodiments one or more of the transfers may be at a block level or at a fraction of the files similar to that described with respect to FIG. 1D.

Figure 2D:
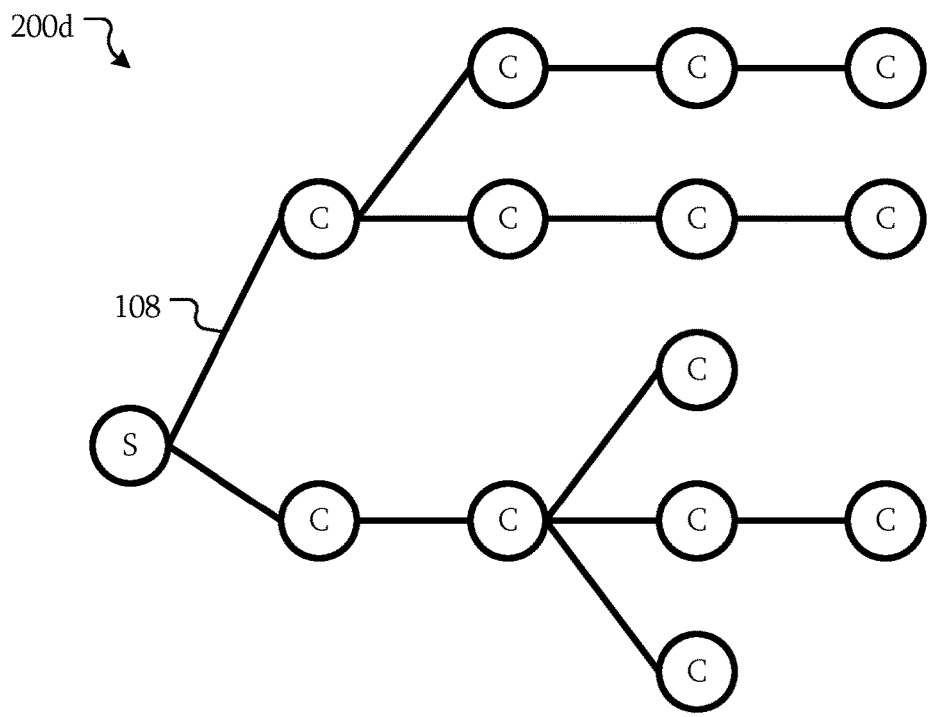
FIG. 2D is a block diagram of a system according to some embodiments.

FIG. 2D is a block diagram of a system according to some embodiments. The system 200d may be similar to the system of FIG. 2B; however, for clarity, because of the number of clients, the server 104 is merely labeled as S, clients 104 are labeled as C, and only one communication link 108 between a server S and client C or between clients C is labeled. As illustrated in FIG. 2D, the server S and each of the clients C may be connected to one or more downstream clients C. In particular, some clients C are connected to multiple downstream clients C. As a result, each client C either receives the files from the server S, or serially through one or more clients C.

In some embodiments, the speed of image distribution may be increased by using the interconnections among the clients 104 instead of hitting the performance limit of the one interconnect between a server 102 and a network switch. That means an achievable bandwidth may be Nc×B where Nc is the number of clients 104 and B is the bandwidth of the network interconnects. Accordingly, for an 8 client 104 cluster on a 1 Gb/s Ethernet network the bandwidth could be about 8 Gb/s.

This higher combined bandwidth is achieved by having clients 104 forward received data to the next client 104 in a series. As a result, the server 102 sends the data only once to the first client 104-1 of a series. Each client 104 can use its maximum bandwidth for sending and receiving data. As a result, the bandwidths of the interconnections sum up to the effective useable bandwidth.

In particular, the server 102 sends first image to first client 104-1. After receiving the first image the client 104-1 forwards this image to the second client 104-2 and is ready to receive the second image from the server 102. The second client 104-2 receives the first image and forwards it to the third client 104-3 when the image is ready. While forwarding, the second client 104-2 is ready to receive the second image. This process repeats for each subsequent client 104. The full aggregate bandwidth may be in use when the number of files to be transmitted exceeds the number of clients. In a particular example, if M files are to be transmitted to each of N clients, where M>N, while the $1^{st}$ file is being transmitted from the N−1-th client 104 to the Nth client 104, the $2^{nd}$ file is being transmitted from the N−2-th client 104 to the N−1-th client 104, etc. while the Nth file is being transmitted from the server 102 to the client 104-1. Thus, during the transfer of the files, N different files are being transmitted simultaneously among the server 102 and clients 104.

Accordingly, the interconnection between the server 102 and the network is reduced or eliminated as the limiting factor. The server 102 sends the files to only one client 104 of a series instead of multiple clients 104. A cost for this performance gain is an increasing delay for the files to be received on clients 104 further from the server 102. For example, if a time to transfer a file from the server 102 to the client 104-1 is about 10 s and you have 4 clients 104 (N=4), the last client 104-4 will have received that file about 30 s after the client 104-1 has received that file.

In a test setup with two systems connected with Gigabit Ethernet, a file was copied from one system to the other using Microsoft Windows filesharing. Of a theoretical 125 MB/s bandwidth of Gigabit Ethernet, about 100 MB/s was achieved. In a second test with the two systems, a file was copied from each system to the other simultaneously. The resulting bandwidth about 140 MB/s, which is smaller than a theoretical 250 MB/s for full-duplex data exchange. However, this illustrates an additional 40 MB/s of bandwidth that may be used to transfer files.

The table below illustrates test results for various test scenarios. In particular, these scenarios include distribution of data on a server to one or more clients 104 using a peer-to-peer system, such as BitTorrent.

| Transfer type | Server Data (GB) | Clients | Total Data to Distribute (GB) | Time | MB/s |
|---|---|---|---|---|---|
| Peer-to-peer | 436 | 1 | 436 | 3:06 h | 40 |
| Peer-to-peer | 436 | 3 | 1308 | 3:06 h | 120 |
| Peer-to-peer | 436 | 8 | 3488 | 10:48 h | 92 |

The table below illustrates results for other scenarios, including a direct transfer from the server to all clients 104 and a transfer technique according to some embodiments as described herein. Here, 1:1 represents a serial transfer of files from the server to client 104 and from client 104 to client 104. 1:2 represents a transfer in parallel from the server to two clients 104 and from those clients 104 to the remaining clients 104, whereby each client transfers in parallel to two other clients (as long as remaining clients are available).

| Transfer type | Server Data (GB) | Clients | Total Data to Distribute (GB) | Time | MB/s |
|---|---|---|---|---|---|
| Direct | 436 | 4 | 1744 | 6 h | 83 |
| 1:1 (serial) | 436 | 4 | 1744 | 4 h | 124 |
| Direct | 436 | 8 | 3488 | 10:30 h | 95 |
| 1:1 (serial) | 436 | 8 | 3488 | 4 h | 248 |
| 1:2 (tree) | 436 | 8 | 3488 | 4:20 h | 229 |

As described above, with total test data on the order of 2-4 TB, a technique according to some embodiments as described herein performed better than both a direct transfer technique and a peer-to-peer system, such as BitTorrent. In addition, scaling a technique according to some embodiments may have a reduced impact or no impact on performance, in contrast to the other techniques. For example, doubling the clients 104 from 4 to 8 when using the direct technique almost doubled the transfer time. However, for the 1:1 scenario, doubling the clients 104 had a negligible effect on the transfer time.

In some embodiments, a system as described herein may be used as part of a screening service provided at a hospital. For each patient there are images from prior studies available on a central archive. When the patient is screened, the new images are sent to a workstation for diagnosis. A radiologist needs the images from the prior studies and the current ones for comparison. In some circumstances, the amount of data for one patient and one study may be from about 0.75 GB to about 2.85 GB. The amount of data to be distributed to each client 104 may be about 1.3 TB or more. The larger data may result from the use of high-resolution tomosynthesis. The prior data is distributed to the workstations during the night before the patient comes to screening so that the prior studies are available for the radiologist. In some embodiments, data for about 300 patients may be transferred per night. The system may have only about 10 hours to receive, prepare, and distribute the data to the clients. In some embodiments, the data of new studies must be available on all workstations within an acceptable time frame for the radiologists. In this example, the server 102 may be configured to distribute image data from the central archive and the clients 104 may be the workstations.

In some embodiments, lossy compression cannot be used because potential for loss of information from a medical procedure. In some embodiments, lossless compression may be performed on the server 102 before the image data is distributed. However, even when compressed, high-resolution image files may still be relatively large.

In some embodiments, a number of expected clients 104 may be about 20. However, in other embodiments, the number of clients 104 may be greater. As described above, adding additional clients 104 may have a reduced impact or no impact on the transfer time. In particular, there are two effects when a server has to transfer all data to each of its clients. The first effect is that the mass of data multiplies with the number of clients. The second effect is that the available bandwidth on the network connection of the server 102 to the network per client 104 reduces with the number of clients. Both effects together work against the performance when huge masses of data are transferred to each client 104 from one server 102 to duplicate the data for each client 104. The bottleneck here is the network connection between the server 102 and the network. The mass of data cannot be reduced when each client 104 needs a local copy of the data.

In some embodiments, using a system and technique as described herein alleviates the second effect from above, i.e., the number of clients 104 may not affect the available performance between the server 102 and the network. Even if there is an effect, the resulting time penalty is reduced. In particular, the server 102 itself does not transfer the data to each client 104. The server 102 transfers the data to less than all of the clients 104 which themselves transfers the data to the remaining clients 104, whether directly or through one or more other remaining clients 104. The bandwidth between the server 102 and the network is split between the smaller number of clients 104 directly served by the server 102. In some embodiments, this number is one, i.e., the server 102 can use the full bandwidth to distribute the data to all clients 104.

In some embodiments, the mass of data still increases with the number of clients, but the available bandwidth per client 104 is not reduced as compared to a direct transfer from the server 102 to all clients 104. However, as a side effect, the clients 104 not directly served by the server 102 get the data delayed. That is, a client 104 further down a serial chain of clients will experience a delay as the data propagates through the serial chain. In some embodiments, a delay may be tolerable. For example, the combination of the transfer time and the longest delay may still be less than the time to transfer the data from the server 102 to all of the clients 104. Moreover, this delay can be reduced by having more branches in the distribution chain. As described above with respect to FIG. 2C, a transfer of files to some clients 104 may take longer as the bandwidth from the server 102 is shared; however, the total time to transfer to all clients 104 is still reduced. In some embodiments, the delay introduced by the serial transfer through clients 104 may be negligible compared with the total time of the transfer of the files through a series of clients 104.

In some embodiments, the system such as the systems 100a, 200a, 200b, and 200d may not include a server 102 or other computer configured to track the location of the files as they are transferred. For example, the server 102 may be configured to merely transfer the files to client 104-1. Once the server 102 has finished that transfer, the server 102 may not handle the transfer of the files to the client 104-2. Although the server 102 may control the arrangement of the communication links 108, the transfer of the files to the client 104-2 may be handled by the client 104-1 alone.

Figure 3:
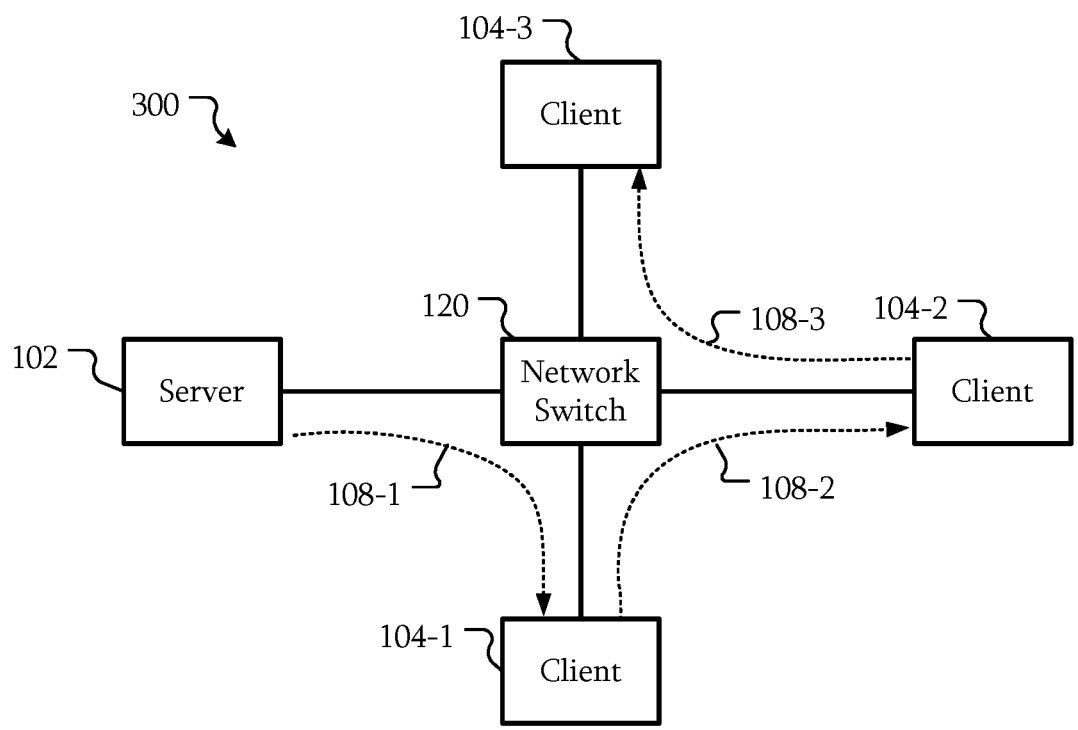
FIG. 3 is a block diagram of a system according to some embodiments.

FIG. 3 is a block diagram of a system according to some embodiments. In some embodiments, the system 300 includes three clients 104-1 through 104-3 and a server 102. The clients 104-1 through 104-3 and the server 102 are each connected to a network switch 120. Each of these connections is a full-duplex connection to the network switch 120. The server 102 and the client 104-1 create a communication link 108-1 using the upstream portion of the physical connection between the server 102 and the network switch 120, the network switch 120 itself, and the downstream connection of the physical connection from the network switch 120 to the client 104-1. The communication links 108-2 and 108-3 are formed similarly using the upstream portion of the connection from the source, the network switch 120, and the downstream portion of the connection to the destination. None of the communication links 108-1 to 108-3 use the same upstream portion or downstream portion as another of the communication links 108-1 to 108-3. As a result, the full bandwidth of these portions may be used to transfer files. Although a single network switch 120 has been used as an example, other embodiments may include other network architectures, such as other network switches 120, routers, wide-area-networks, remote networks, or the like.

Figure 4A:
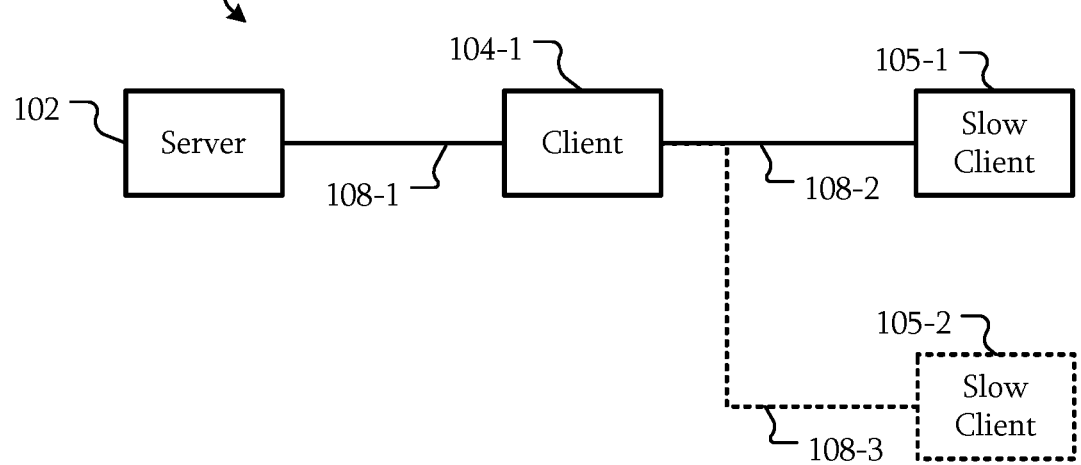
FIGS. 4A-C are block diagrams of systems with slow clients according to some embodiments.
Figure 4B:
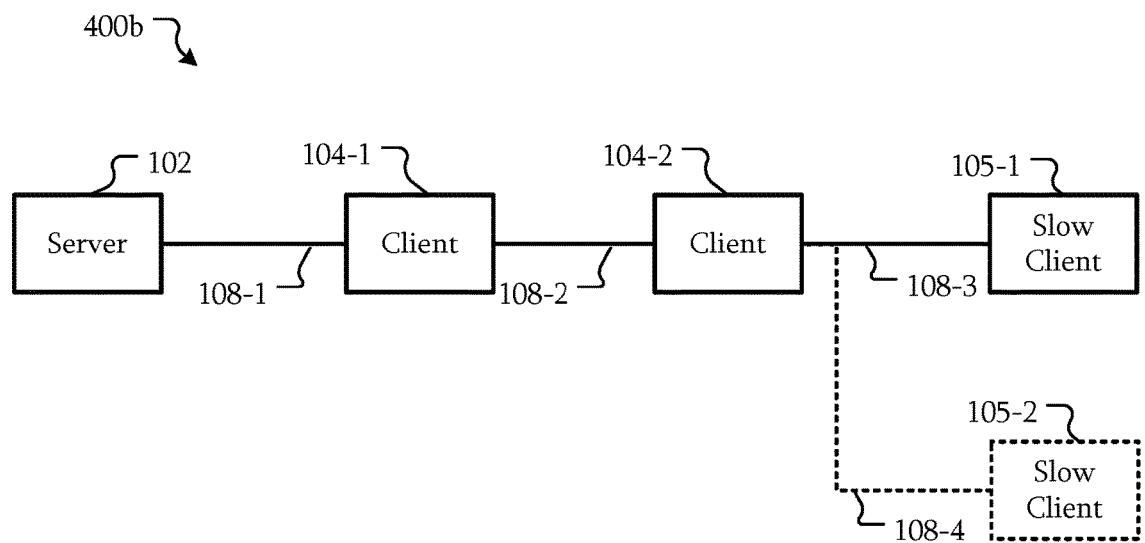
Figure 4C:
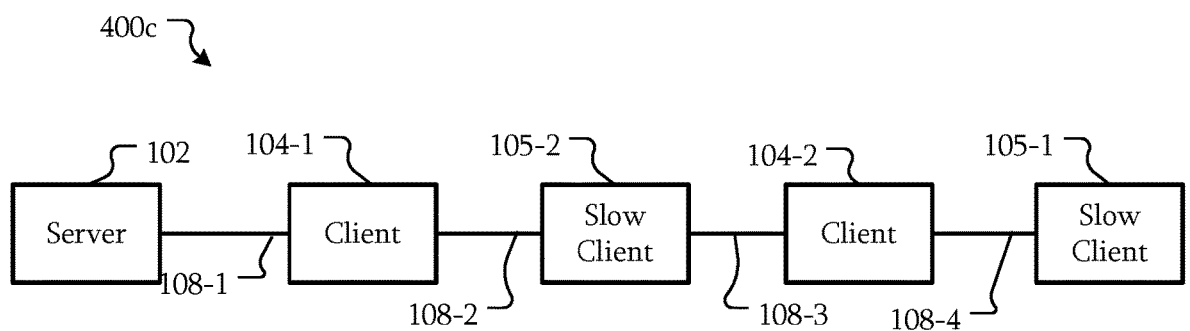

FIGS. 4A-C are block diagrams of systems with slow clients according to some embodiments. Referring to FIG. 4A, in some embodiments, the system 400a may be similar to the systems 100a, 200a, 200b, and 300 as described above. However, the system 400a includes a client 105 or the communication links 108 to a client 105 may have a bandwidth lower than that of other communication links 108. These slow client(s) 105 may be placed after a faster client 104 or at the end of a series of clients 104.

Referring to FIG. 4B, in some embodiments, the system 400b may be similar to the systems 100a, 200a, 200b, 300, and 400a as described above. However, multiple clients 104 may be connected in the series before the slow client(s) 105.

In some embodiments, a group of slow clients 105, such as slow clients 105-1 and 105-2, may be connected to a last client 104 in a series. As a result, a delay due to the slow client(s) 105 may only affect the slow client(s) 105. Any other clients 104 are insulated from that delay.

Referring to FIG. 4C, in some embodiments, a slow client such as slow client 105-2 may appear in a series of clients 104 and 105. For example, a load on the client may be increased, the performance of writing data to a memory 152 of the client may be reduced, a network connection may be deteriorated, damaged, or broken, the throughput through the client 105 may be reduced to eliminated, or the like. Accordingly, the communication links 108 may be reorganized to accommodate the change. For example, the connections between clients 104 and 105 in FIG. 4C may be reorganized to be as in FIG. 4B. That is, the communication links 108 may be reorganized so that the slow clients 105 are connected at the end of a series of clients 104 at client 104-2.

Although the slow clients 105 are illustrated as being connected to the end of a particular series of clients 104, in other embodiments, a slow client 105 may be moved to be at the end of another series of clients 104, such as at the end of an M-th series of clients in FIG. 2B.

Figure 5A:
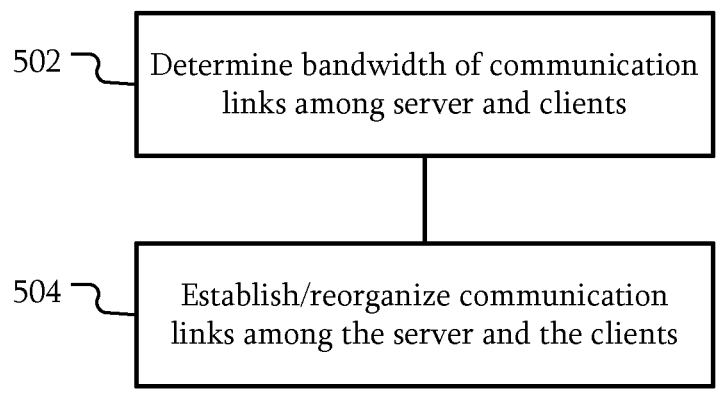
FIGS. 5A-B are flowcharts of reorganizing communication links to clients according to some embodiments.
Figure 5B:
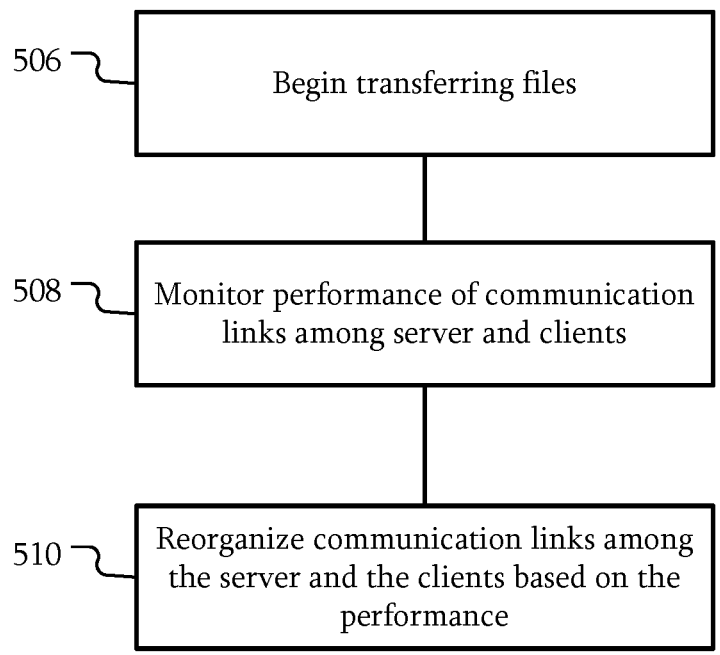

FIGS. 5A-B are flowcharts of reorganizing communication links to clients according to some embodiments. Referring to FIG. 5A, in some embodiments, a bandwidth of communication links among a server and clients are determined in 502. For example, before forming communication links as described above, a bandwidth of one or more possible communication links between the clients and server may be measured. In some embodiments, the bandwidth of each combination of pairs of the server and the clients may be measured.

Using the bandwidths determined in 502, in 504, the communication links among the server and the clients may be established or reorganized. For example, clients may be moved to a single series. In another example, clients may be distributed among multiple series. In another example, slower clients may be moved to an end of a series. In another example, clients may be ordered so that independent portions of bandwidths of the communication links are constant or decrease with distance from the server. In another example, the communication links may be reorganized to optimize a transfer time of a given number of files. In another example, the communication links may be reorganized to optimize the transfer time of files to a subset of less than all of the clients.

Referring to FIG. 5B, in some embodiments, in 506, the transfer of files may begin as described above. In 508, during the transfer of the files, the performance of the communication links among the server and the clients may be monitored. For example, one or more of the source and destination associated with a communication link may measure the instantaneous bandwidth, average bandwidth, or the like between the source and destination.

In 510, the communication links may be rearranged based on the monitored performance. The performance data may be used to rearrange the communication links as in 504 of FIG. 5A.

Some embodiments include a computer readable medium storing instructions that, when executed, cause the computer to perform one or more of the operations described above. For example, such instructions may include instructions for execution by one or more of a server 102 and clients 104 to implement the operations described above.

Referring to FIGS. 1A-5B, some embodiments include a method, comprising: transmitting a plurality of files from a server 102 to a first client 104 through a first communication link 108; and transmitting the plurality of files from the first client 104 to a second client 104 through a second communication link 108 while transmitting at least one of the plurality of files from the server 102 to the first client 104; and the second communication link 108 has at least some bandwidth independent of the first communication link 108.

In some embodiments, the first communication link 108 and the second communication link 108 have independent bandwidths.

In some embodiments the method further comprises transmitting the files to a third client 104 through a third communication link 108.

In some embodiments, transmitting the files to the third client 104 comprises transmitting the files from the server 102 to the third client 104 through the third communication link 108.

In some embodiments, transmitting the files to the third client 104 comprises transmitting the files from the second client 104 to the third client 104 through the third communication link 108 while transmitting at least one of the files from the first client 104 to the second client 104.

In some embodiments, the method further comprises reorganizing communication links 108 among the server 102, the first client 104, the second client 104, and the third client 104 based on bandwidth such that the files are transmitted from the server 102 through higher bandwidth communication links 108 among the reorganized communication links 108 first.

In some embodiments, transmitting the files from the first client 104 to the second client 104 through the second communication link 108 comprises transmitting at least part of one the files from the first client 104 to the second client 104 while transmitting the one of the files from the server 102 to the first client 104 through the first communication link 108.

In some embodiments, the method further comprises selecting the first client 104 and the second client 104 from among a plurality of clients 104 based on at least one of: a bandwidth between the server 102 and the first client 104; a bandwidth between the server 102 and the second client 104; and a bandwidth between the first client 104 and the second client 104; and a performance of writes to a memory 152 of at least one of the first client 104 and the second client 104.

In some embodiments, a bandwidth of the second communication link 108 is less than a bandwidth of the first communication link 108.

In some embodiments, each of the files comprises image data with lossless compression.

In some embodiments, the first client 104 and the second client 104 are part of a plurality of clients 104; and further comprising for a first at least one of the clients 104, receiving the files through a first series of at least two of the other clients 104.

In some embodiments, the method further comprises for a second at least one of the clients, receiving the files through a second series of at least two of the other clients; wherein at least one of the clients in the first series is different from each of the clients in the second series.

Some embodiments include a system, comprising: a first communication link 108; a second communication link 108; a server 102; a first client 104 coupled to the server 102 through the first communication link 108; and a second client 104 coupled to the first client 104 through the second communication link 108; wherein: the second communication link 108 has at least some bandwidth independent of the first communication link 108; the server 102 is configured to transmit a plurality of files to the first client 104 through the first communication link 108; and the first client 104 is configured to transmit the files from the first client 104 to the second client 104 through the second communication link 108 while the server 102 is transmitting at least one of the files from the server 102 to the first client 104.

In some embodiments of the system, the first communication link 108 comprises a portion of a full duplex connection between the server 102 and a network switch and a downstream portion of a full duplex connection between the network switch and the first client 104; and the second communication link 108 comprises an upstream portion of the full duplex connection between the network switch and the first client 104.

In some embodiments of the system, the first client 104 and the second client 104 are part of a plurality of clients 104; and further comprising for at least one of the clients 104, the client 104 is configured to receive the files through at least two of the other clients 104 in series.

In some embodiments of the system, the server 102 is configured to reorganize communication links 108 among the server 102 and the clients 104 based on bandwidth such that the files are transmitted from the server 102 through higher bandwidth communication links 108 among the reorganized communication links 108 first.

In some embodiments of the system, the first client 104 is configured to transmit at least part of one the files from the first client 104 to the second client 104 while the server 102 is transmitting the one of the files from the server 102 to the first client 104 through the first communication link 108.

In some embodiments of the system, the server 102 is configured to select the first client 104 and the second client 104 from among a plurality of clients 104 based on at least one of: a bandwidth between the server 102 and the first client 104; a bandwidth between the server 102 and the second client 104; and a bandwidth between the first client 104 and the second client 104.

In some embodiments, the system further comprises: a third communication link 108; and a third client 104; wherein the server 102 is configured to transmit the files to the third client 104 through the third communication link 108.

In some embodiments, the system further comprises: a third communication link 108; and a third client 104; wherein the second client 104 is configured to transmit the files to the third client 104 through the third communication link 108.

Some embodiments include a system, comprising: means for transmitting a plurality of files from a server 102 to a first client 104; and means for transmitting the files from the first client 104 to a second client 104 while transmitting at least one of the files from the server 102 to the first client 104; wherein the means for transmitting the files from the first client 104 to the second client 104 has at least some bandwidth independent of the means for transmitting the files from the server 102 to the first client 104.

Examples of the means for means for transmitting a plurality of files from a server 102 to a first client 104 and the means for transmitting the files from the first client 104 to a second client 104 include the communication links 108, network switch 120, network interface 156, downstream connection 160, and upstream connection 162 described above.

Some embodiments include a computer readable medium having instructions stored thereon, the instructions comprising: instructions for transmitting a plurality of files from a server 102 to a first client 104 through a first communication link; and instructions for transmitting the files from the first client 104 to a second client 104 through a second communication link 108 while transmitting at least one of the files from the server 102 to the first client; wherein the second communication link 108 has at least some bandwidth independent of the first communication link.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 ¶ 6. Embodiments of the invention in which an exclusive property or privilege is claimed are defined as follows.

The invention claimed is:

1. A method, comprising:
    transmitting a plurality of files from a server to a first client through a first communication link; and
    transmitting the files from the first client to a second client through a second communication link while transmitting at least one of the files from the server to the first client;
    wherein:
        the second communication link has at least some bandwidth independent of the first communication link;
        the first client and the second client are part of a plurality of clients; and
        the transmitting of the files from the server to the first client and the transmitting of the files from the first client to the second client comprise transmitting the files through a first series of at least two of the clients; and
    further comprising:
        identifying a slow client having a throughput that changes to be less than a throughput of a faster client; and
        reorganizing the communication links to place the slow client after the faster client in a second series of at least some of the clients including the faster client and the slower client.

2. The method of claim 1, wherein the first communication link and the second communication link have independent bandwidths.

3. The method of claim 1, further comprising:
    transmitting the files to a third client through a third communication link;
    wherein transmitting the files to the third client comprises transmitting the files from the server to the third client through the third communication link.

4. The method of claim 1, further comprising:
    transmitting the files to a third client through a third communication link;
    wherein transmitting the files to the third client comprises transmitting the files from the second client to the third client through the third communication link while transmitting at least one of the files from the first client to the second client.

5. The method of claim 1, further comprising:
    transmitting the files to a third client through a third communication link; and
    reorganizing communication links among the server, the first client, the second client, and the third client based on bandwidth such that the files are transmitted from the server through higher bandwidth communication links among the reorganized communication links first.

6. The method of claim 1, wherein transmitting the files from the first client to the second client through the second communication link comprises transmitting at least part of one of the files from the first client to the second client while transmitting the one of the files from the server to the first client through the first communication link.

7. The method of claim 1, further comprising selecting the first client and the second client from among the plurality of clients based on at least one of:
    a bandwidth between the server and the first client;
    a bandwidth between the server and the second client;
    a bandwidth between the first client and the second client; and
    a performance of writes to a memory of at least one of the first client and the second client.

8. The method of claim 1, wherein a bandwidth of the second communication link is less than a bandwidth of the first communication link.

9. The method of claim 1, wherein each of the files comprises image data with lossless compression.

10. The method of claim 1, further comprising:
for at least one of the clients, receiving the files through a second series of at least two of the other clients;
wherein at least one of the clients in the first series is different from each of the clients in the second series.

11. A computer readable medium having instructions stored thereon adapted to perform the method of claim 1.

12. A system, comprising:
a first communication link;
a second communication link;
a server;
a first client coupled to the server through the first communication link; and
a second client coupled to the first client through the second communication link;
wherein:
the second communication link has at least some bandwidth independent of the first communication link;
the server is configured to transmit a plurality of files to the first client through the first communication link;
the first client is configured to transmit the files from the first client to the second client through the second communication link while the server is transmitting at least one of the files from the server to the first client;
the first client and the second client are part of a plurality of clients;
for at least one of the clients, the client is configured to receive the files through at least two of the other clients in series through corresponding communication links; and
the server is configured to:
control the arrangement of the communication links;
identify a slow client having a throughput that changes to be less than a throughput of a faster client; and
reorganize the communication links to place the slow client after the faster client in a second series of at least some of the clients including the faster client and the slower client.

13. The system of claim 12, wherein:
the first communication link comprises a portion of a full duplex connection between the server and a network switch and a downstream portion of a full duplex connection between the network switch and the first client; and
the second communication link comprises an upstream portion of the full duplex connection between the network switch and the first client.

14. The system of claim 12, wherein the server is configured to reorganize communication links among the server and the clients based on bandwidth such that the files are transmitted from the server through higher bandwidth communication links among the reorganized communication links first.

15. The system of claim 12, wherein the first client is configured to transmit at least part of one of the files from the first client to the second client while the server is transmitting the one of the files from the server to the first client through the first communication link.

16. The system of claim 12, wherein the server is configured to select the first client and the second client from among the plurality of clients based on at least one of:
a bandwidth between the server and the first client;
a bandwidth between the server and the second client;
a bandwidth between the first client and the second client; and
a performance of writes to a memory of at least one of the first client and the second client.

17. The system of claim 12, further comprising:
a third communication link; and
a third client of the plurality of clients;
wherein the server is configured to transmit the files to the third client through the third communication link.

18. The system of claim 12, further comprising:
a third communication link; and
a third client of the plurality of clients;
wherein the second client is configured to transmit the files to the third client through the third communication link.

19. A system, comprising:
means for transmitting a plurality of files from a server to a first client; and
means for transmitting the files from the first client to a second client while transmitting at least one of the files from the server to the first client;
wherein:
the means for transmitting the files from the first client to the second client has at least some bandwidth independent of the means for transmitting the files from the server to the first client; and
the means for transmitting the files from the first client to the second client is in series with the means for transmitting the files from the server to the first client; and
further comprising:
means for identifying a slow client having a throughput that changes to be less than a throughput of a faster client; and
means for reorganizing the communication links to place the slow client after the faster client in a second series of at least some of the clients including the faster client and the slower client.

20. The method of claim 1, wherein identifying the slow client having the throughput less than the throughput of the faster client comprises at least one of:
identifying a decreased bandwidth of a communication link coupled to the slow client;
identifying an increased load on the slow client; and
identifying a reduced memory write performance of the slow client.

* * * * *